D. C. PICKETT.
SHOCK ABSORBER.
APPLICATION FILED FEB. 14, 1917.

1,241,438.

Patented Sept. 25, 1917.
2 SHEETS—SHEET 1.

WITNESSES

INVENTOR
D. C. Pickett,
BY Victor J. Evans
ATTORNEY

D. C. PICKETT.
SHOCK ABSORBER.
APPLICATION FILED FEB. 14, 1917.
1,241,438. Patented Sept. 25, 1917.
2 SHEETS—SHEET 2.
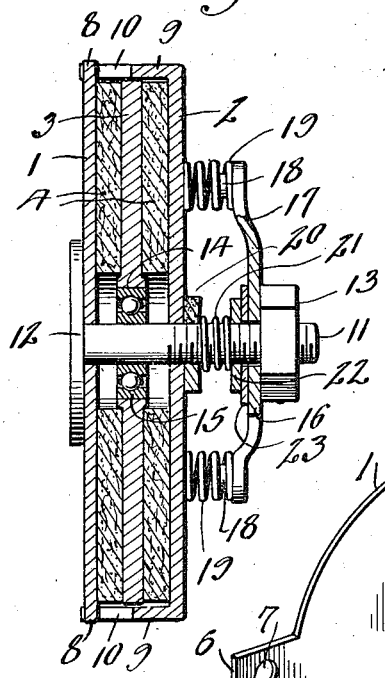
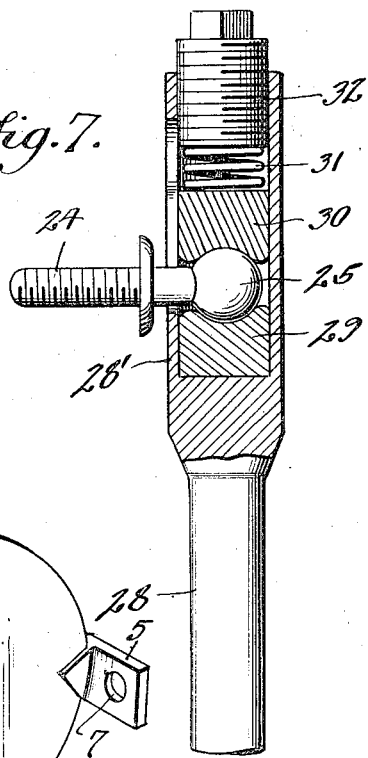
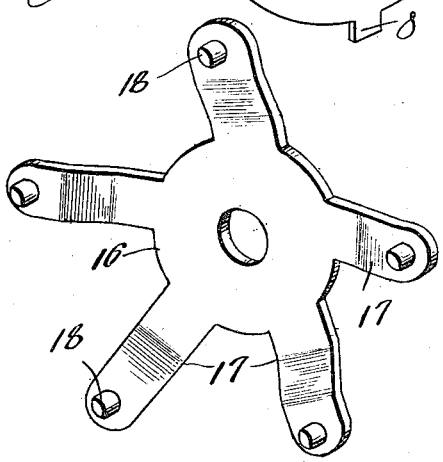
INVENTOR
D. C. Pickett,
BY Victor J. Evans
ATTORNEY
WITNESSES

UNITED STATES PATENT OFFICE.

DAVID CARL PICKETT, OF CANTON, ILLINOIS.

SHOCK-ABSORBER.

1,241,438.　　　　　　　Specification of Letters Patent.　　Patented Sept. 25, 1917.

Application filed February 14, 1917. Serial No. 148,540.

*To all whom it may concern:*

Be it known that I, DAVID CARL PICKETT, a citizen of the United States, residing at Canton in the county of Fulton and State of Illinois, have invented new and useful Improvements in Shock-Absorbers, of which the following is a specification.

This invention relates to shock absorbers for wheeled vehicles and particularly motor vehicles such as automobiles, motor trucks and the like, the object of the invention being to produce a shock absorber of the friction type, embodying in connection with a plurality of stationary abutment members, one or more movable friction members coacting therewith, and a movable abutment member coacting with the friction member or members, together with tensioning means for producing greater or less friction in accordance with the load imposed on the vehicle, also tension equalizing or distributing means, readily adjustable for the purpose stated.

A further object of the invention is to provide a novel coupling member by means of which one of the abutment members is connected to the vehicle to produce a relative rotative movement between the abutment members, to automatically compensate for wear, and to prevent noise and rattling, thereby rendering the device silent in operation.

A further object in view is to provide in connection with the movable abutment member, a ball bearing so arranged as to greatly prolong the life of the shock absorber as a whole, and in connection with said bearing to provide a dust and dirt guard which will exclude foreign matter from the bearing.

With the above and other objects in view, the invention consists in the novel construction, combination and arrangement of parts, herein fully described, illustrated and claimed.

In the accompanying drawings:—

Fig. 2 is an enlarged section through the same on the line 2—2 of Fig. 1.

Fig. 4 is a similar view of the other abutment plate.

Fig. 5 is a side elevation of the movable abutment member.

Fig. 6 is a perspective view of the tension equalizer or the distributer.

Fig. 7 is an enlarged detail sectional view of the coupling member.

Figure 1:
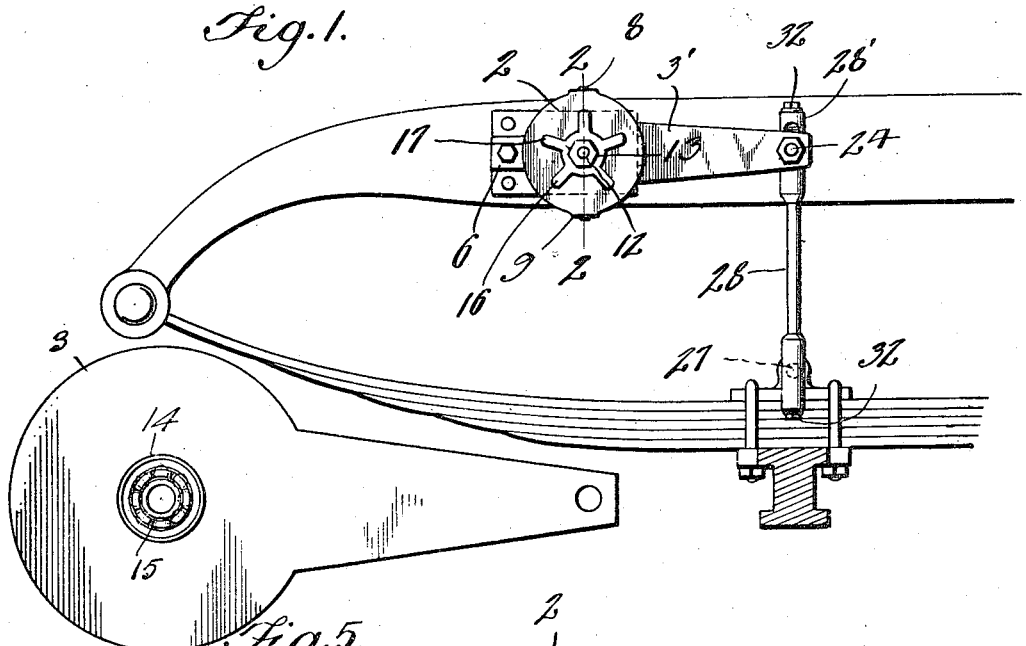
Figure 1 is a side elevation of the shock absorber shown in its applied relation to a motor vehicle.
Figure 3:
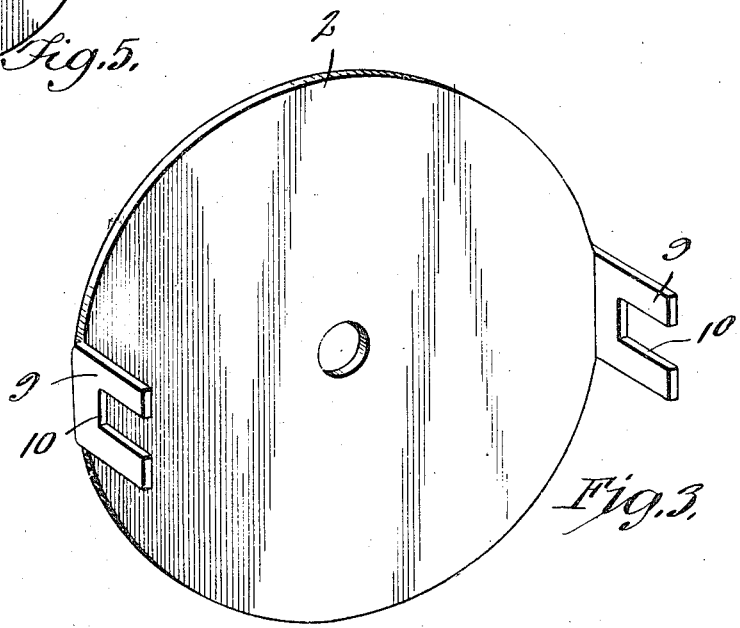
Fig. 3 is a detail perspective view of one of the stationary abutment plates.

The shock absorber contemplated in this invention comprises, in a simple and preferred embodiment thereof, a pair of stationary abutment plates or members 1 and 2, a movable abutment member 3 interposed between the stationary abutment members 1 and 2, and friction members 4 lying at opposite sides of the movable abutment member 3 and in contact with the inner faces of the stationary abutment members 1 and 2, as shown in Fig. 2.

The stationary abutment member 1 is designed to be fastened to the frame, chassis or body of the vehicle, and for that purpose is provided with attaching lugs 5 and 6 shown as arranged diametrically opposite each other, projecting from the periphery of the member 1 which is shown as in the form of a disk, and provided with holes 7 to receive bolts, rivets or other fastening means by which said stationary abutment plate or member 1 is fixedly secured in place in relation to the frame or body of the vehicle. The member 1 is also provided with lugs or keys 8 projecting from the periphery thereof and the purpose of which will presently appear. Two of such lugs or keys 8 are shown arranged diametrically opposite each other.

The other stationary abutment plate or member 2 is also by preference in the form of a disk of the same size as the member 1 and is formed with laterally projecting ears or holders 9 arranged diametrically opposite each other and formed with open ended slots or notches 10 to receive the lugs or keys 8 of the member 1, whereby the members 1 and 2 are prevented from relative rotative movement. As the member 1 is held stationary or in fixed relation to the frame or body of the vehicle, it follows that the member 2 is likewise stationary or at least to the extent of being non-rotary. The member 2 is capable of a limited amount of adjustment toward and away from the member 1. The ears 9 are so arranged that they overlap the periphery of the member 1 and they thus also serve as braces for holding the member 2 in alinement with the member 1.

A shaft 11 shown in the form of a bolt having a head 12 at one end and having a nut 13 threaded on the other end thereof, passes through the members 1, 2 and 3 and also through the friction members 4, holding all of said members in their proper relative positions after the several parts of the shock absorber have been assembled.

The movable abutment plate or member 3 comprises a disk-shaped body portion of approximately the same diameter, or slightly less than that of the stationary members 1 and 2 and in addition thereto the member 3 comprises a radially extending operating arm 3′ the purpose of which will appear. The member 3 is formed with a central circular opening 14 in which is arranged a radial thrust ball bearing 15 embodying suitable retaining means for holding the same in place in said opening. The bolt 11 passes through the ball bearing 15 and by materially reducing the wear between the abutment member 3 and the bolt 11, the life of the shock absorber as a whole is greatly prolonged.

Mounted adjustably upon the bolt 11 at the outer side of the stationary abutment member 2 is a tension equalizing and distributing member 16 which is shown in the form of a spider, the same comprising a series of arms 17 radiating therefrom and deflected inwardly from the body of the member 16 toward the outer face of the stationary abutment member 2. The arms 7 are provided on their inner surfaces with studs 18 which fit into the outer extremities of yieldable members 19 shown in the form of coiled springs the inner ends of which bear directly against the member 2. By thus providing a number of arms 17 and springs 19, the pressure against the member 2 is distributed and equalized thus correspondingly distributing and equalizing the pressure between the members 2, 3 and 4, and the inner abutment member 1. The nut 13 bears directly against the tensioning member 16 so that by means of said nut, the springs 19 may be placed under greater or less tension for the purpose of affording more or less friction between the surface of the abutment members and friction members, thereby enabling the shock absorbing device to be regulated to vehicles of different sizes and to accommodate different loads.

Surrounding the bolt 11 and bearing against the abutment member 2 is a flexible washer or disk 20 of felt or similar material and bearing against the outer side of said washer is a spring 21 the outer end of which bears against a washer 22 of soft material such as leather which is in turn supported by a metal washer 23 which bears against the inner face of the member 16. The spring 21 holds the felt washer tightly against the member 2 and enables it to exclude foreign matter from the bearing 15.

Extending laterally from the extremity of the arm 3′ is a stud 24 having a spherical head or ball 25. A similar stud 26 is fastened to the adjacent axle, clip, or spring, and is provided with a similar spherical head or ball 27. A coupling member 28 in the form of a rod extends from the head 25 to the head 27. Each end portion of the coupling member 28 is of tubular formation as indicated at 28′ and contains a pair of bearing blocks 29 and 30 of sound absorbing material such as fiber. The blocks 29 and 30 are formed with hemispherical sockets as shown to receive the adjacent head or ball 25 or 27 and one of said blocks 30 is movable to compensate for wear, being backed up by a follower spring 31 which may be given more or less tension by means of a tensioning member 32 shown in the form of a plug threaded into the end of the tubular portion 28′ of the coupling member 28. The construction just described prevents rattling and squeaking between the coupling member 28, the arm 3′ and the attaching means by which the coupling member is secured to the axle or a part carried thereby.

From the foregoing description taken in connection with the accompanying drawings it will be apparent that the device as a whole is of simple construction, easy and cheap to manufacture, durable in service, light in weight, may be applied to practically any make of motor vehicle now in use and that it operates to relieve vehicle springs, removing the road jars and vibrations therefrom, checking the rebound and vehicle springs of the body and in that way causing the vehicle to better hold the road. Furthermore the device operates to maintain the wheels in engagement and contact with the road and thereby reduces the wear and tear on the tires. By means of the single nut 13, any desired tension may be put on the coacting friction surfaces of the shock absorber in accordance with the load imposed thereon. The use of the ball bearing eliminates the employment of the bushings now in common use and which wear away very quickly resulting in constant rattling and ultimate breakage of the shock absorber. The means by which the stationary abutment members 1 and 2 are interlocked with each other at the peripheries thereof, is of great importance as the relative strain between said members is reduced to a minimum. By means of the tensioning member or spider, and the springs controlled thereby, the friction is equalized and distributed throughout all of the coacting friction surfaces. The special construction of the coupling member 28 eliminates noise and enables the shock absorber to perform its function silently. All dust, dirt and other foreign matter are excluded from the bearing by means of the felt washer which is held to its position yieldingly by means of the spring described.

I claim:—

1. In a shock absorber, the combination of stationary abutment members arranged in spaced relation to each other, a movable abutment member interposed between said stationary abutment members, friction members arranged at opposite sides of said movable abutment member and between the latter and the stationary abutment members, a bolt passing through all of said members, and tensioning means on said bolt for increasing and decreasing the frictional contact between said abutment and friction members, one of said stationary abutment members having a key at the outer margin and the other abutment member having means coacting with said key to prevent relative rotative movement of said stationary abutment members.

2. In a shock absorber, the combination of stationary abutment members arranged in spaced relation to each other, a movable abutment member interposed between said stationary abutment members, friction members arranged at opposite sides of said movable abutment member and between the latter and the stationary abutment members, a bolt passing through all of said members, and tensioning means on said bolt for increasing and decreasing the frictional contact between said abutment and friction members, one of said stationary abutment members having a key at the outer margin and the other abutment member having means coacting with said abutment members, said key and coacting means having a relative sliding movement and overlapping relation permitting one of said stationary abutment members to be adjusted toward and away from the other stationary abutment member.

3. In a shock absorber, the combination of stationary abutment members arranged in spaced relation to each other, a movable abutment member interposed between said stationary abutment members, friction members arranged at opposite sides of said movable abutment member and between the latter and the stationary abutment members, a bolt passing through all of said members, tensioning means on said bolt for increasing and decreasing the frictional contact between said abutment and friction members, one of said stationary abutment members having a key at the outer margin and the other abutment member having means coacting with said key to prevent relative rotative movement of said stationary abutment members, said tensioning means comprising a tension equalizing member on said bolt at the outer side of the adjacent stationary abutment member, and a circular series of yieldable members interposed between said tension equalizing member and the adjacent stationary abutment member.

4. In a shock absorber, the combination of stationary abutment members arranged in spaced relation to each other, a movable abutment member interposed between said stationary abutment members, friction members arranged at opposite sides of said movable abutment member and between the latter and the stationary abutment members, a bolt passing through all of said members, tensioning means on said bolt for increasing and decreasing the frictional contact between said abutment and friction members, one of said stationary abutment members having a key at the outer margin and the other abutment member having means coacting with said key to prevent relative rotative movement of said stationary abutment members, a ball bearing located within the movable abutment member and surrounding said bolt, and a flexible spring pressed dust guard surrounding said bolt and lying in contact with the outer face of one of said stationary abutment members.

In testimony whereof I affix my signature.

DAVID CARL PICKETT.